March 28, 1961 J. P. FLANNERY 2,976,746

WASHING MACHINE TRANSMISSION

Filed Jan. 28, 1957 3 Sheets-Sheet 1

INVENTOR
JOHN P. FLANNERY
BY F. P. Keiper

March 28, 1961 J. P. FLANNERY 2,976,746

WASHING MACHINE TRANSMISSION

Filed Jan. 28, 1957 3 Sheets-Sheet 2

March 28, 1961 J. P. FLANNERY 2,976,746

WASHING MACHINE TRANSMISSION

Filed Jan. 28, 1957 3 Sheets-Sheet 3

United States Patent Office 2,976,746
Patented Mar. 28, 1961

1

2,976,746

WASHING MACHINE TRANSMISSION

John P. Flannery, Syracuse, N.Y., assignor to The Murray Corporation of America, Syracuse, N.Y., a corporation of Delaware Filed Jan. 28, 1957, Ser. No. 636,706
14 Claims. (Cl. 74—665)

This invention relates to washing machines of the centrifugal extractor type, and to a transmission therefor having a constant torque friction drive for centrifugal extractor acceleration, or other purposes.

In washing machines of the type generally shown in a copending application of Leach Ser. No. 359,100, filed June 2, 1953, now Patent No. 2,813,413, and also as disclosed in Castner 2,513,844, granted July 4, 1950, acceleration of the vertical axis centrifugal extractor tub is attained by the use of a fluid drive coupling, which permits the drive motor of the constant speed induction type to operate at full speed, during the gradual acceleration of the tub. Such a coupling is expensive, is bulky and precludes location within a transmission housing, so that complicated separate drives as by numerous belts and pulleys or the equivalent are required. Such fluid drives do not operate efficiently at different motor drive speeds, because the torque is dependent upon the motor driving speed.

The present invention is directed to a compact washing machine transmission adapted to provide a drive, for example, for an oscillating agitator, and also an accelerating drive for tub rotation and centrifugal extraction. The invention more particularly contemplates the employment of a reversible drive motor operating at its rated speed, and utilizes reversal of the motor as a means of selecting automatically either agitator actuation or centrifugal extraction. The transmission unit employs a direct motor drive, not only to the transmission but to the pump, the latter being made possible by the operation of the motor at its rated speed during the acceleration time required for centrifugal extraction.

A feature of the invention is also directed to a friction constant torque drive, of unusual compactness and simplicity whereby the gradual acceleration of the extractor tub may be effected while the constant speed drive motor operates normally at its rated speed, or speeds, if a two speed motor.

A further feature of the invention having to do with the constant torque friction drive is the provision through use of the elements thereof, of an automatically operative brake, operative the instant driving torque is terminated.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

2

Figures 1, 5, 6:
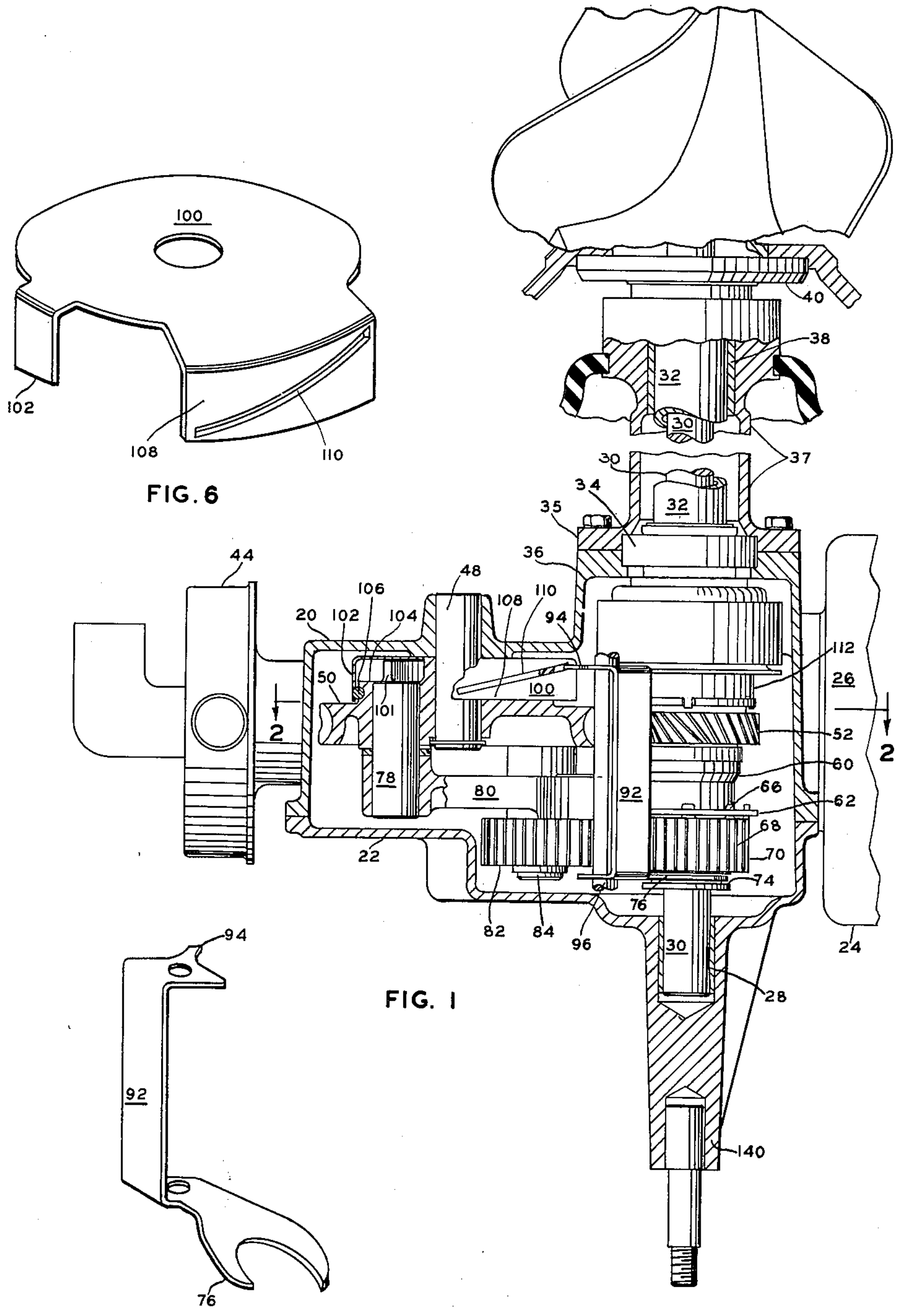
Figure 1 is a vertical sectional view of the transmission.
Figure 2:
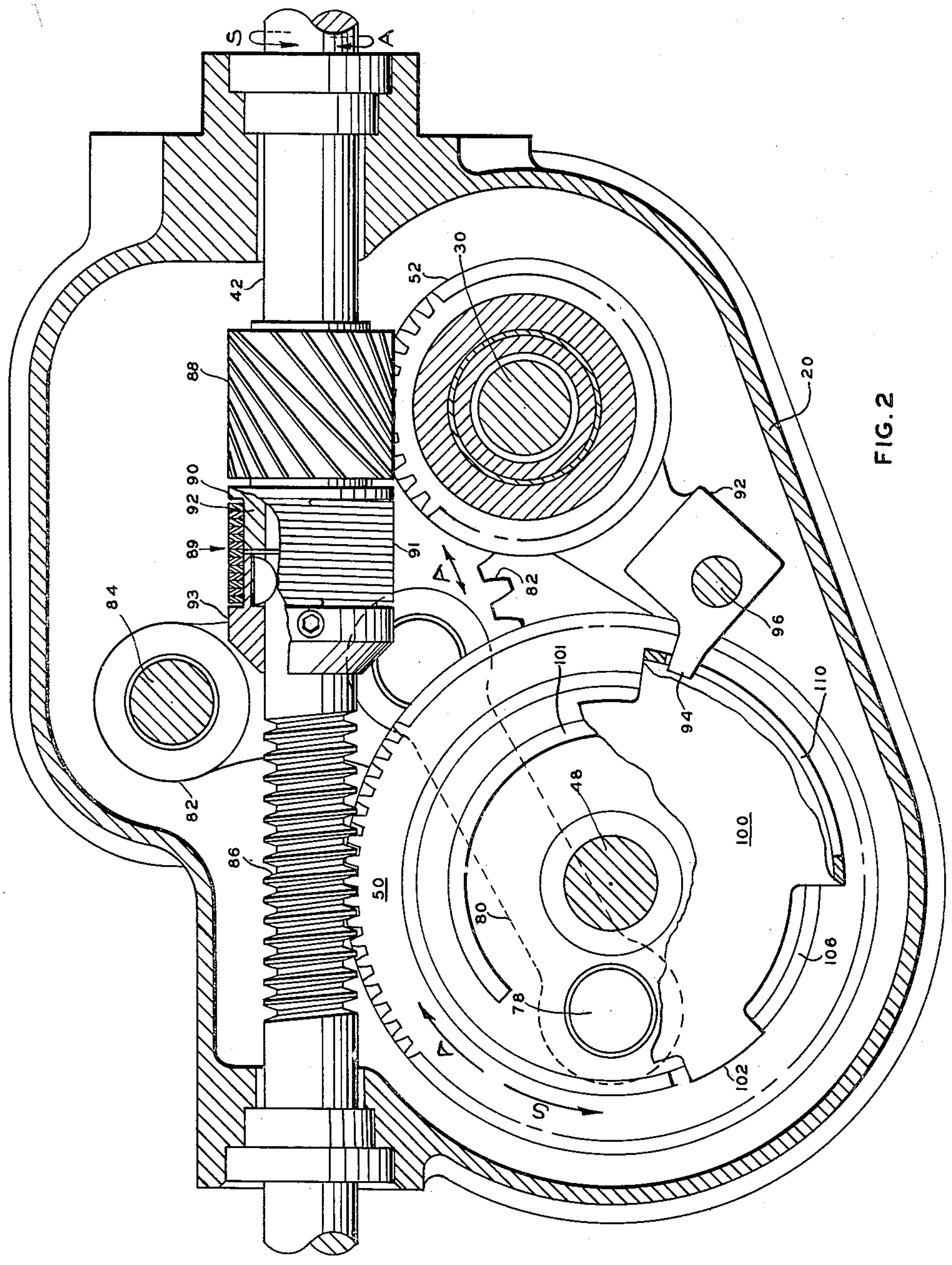
Figure 2 is a transverse sectional view taken substantially on the line 2—2 of Figure 1.
Figures 3, 4:
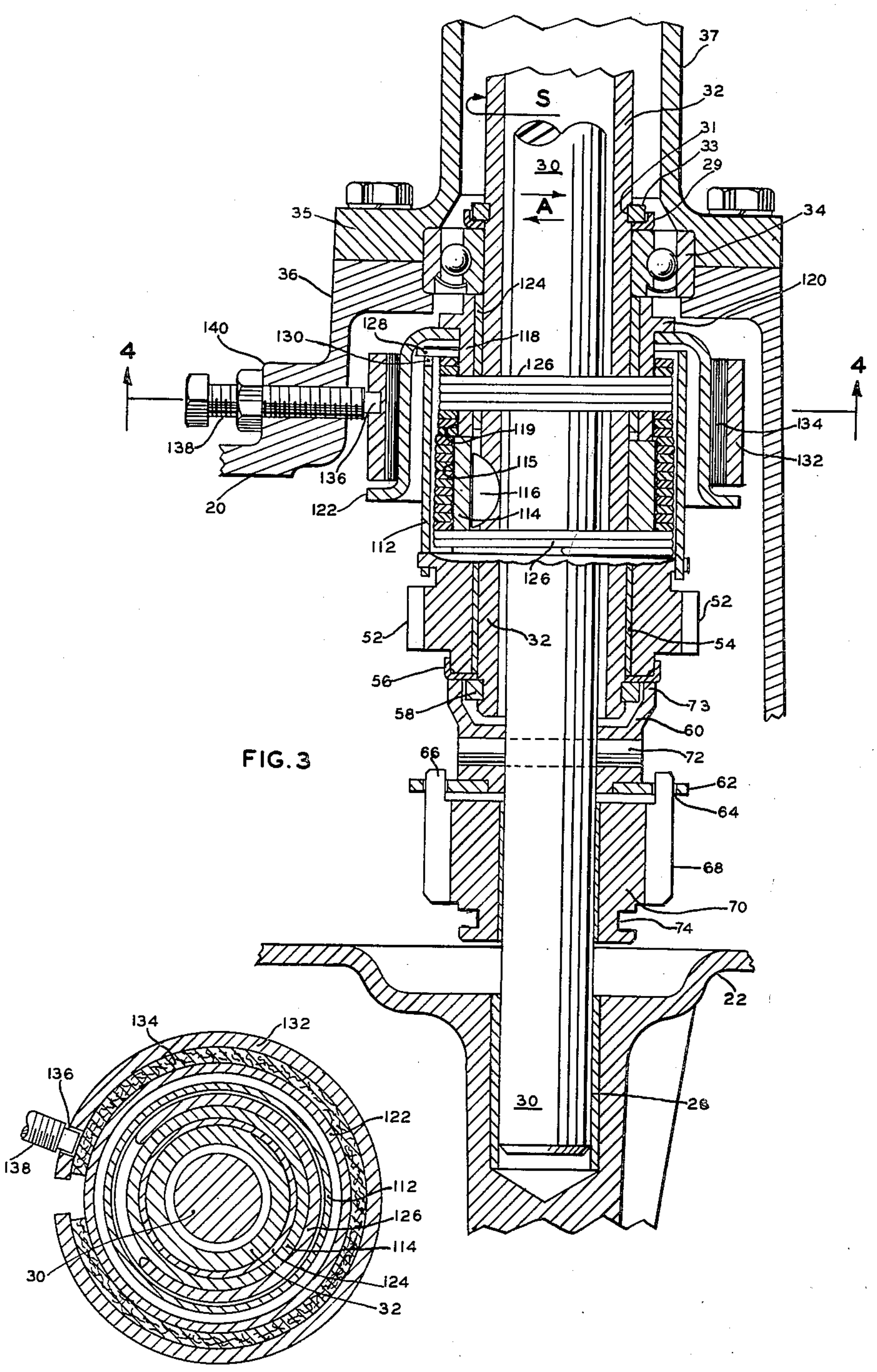
Figure 3 is an enlarged sectional view of the friction drive and brake of Figure 1.

Figure 4 is a transverse sectional view through the brake taken on line 4—4 of Figure 3;

Figure 5 is a perspective view of the shifter fork and frame; and

Figure 6 is a perspective view of the shifter fork cam actuation disk.

In the drawings, the transmission comprises upper and lower housing members 20, 22, the upper housing having affixed to one side thereof, the end bell 24 of a reversible induction drive motor 26. Journalled in the lower member 22, as at 28 and extending upwardly through the transmission is an agitator drive shaft 30. Surrounding the agitator shaft, is a tub spin drive shaft, in the form of a tubular sleeve shaft 32. Such sleeve shaft is journalled in a ball thrust bearing 34, clamped between the upstanding hollow boss 36 of the upper casing member 20, and the lower flange 35 of an upstanding hollow pedestal 37. The pedestal has in its upper end a bearing sleeve 38, for the sleeve shaft 32. The shaft 32, is provided at its upper end with a tub support flange 40, while the agitator shaft extends upwardly thereabove to an agitator drive block, not shown. The agitator shaft may have a bearing (not shown) at its upper end below the drive block, in a hollow tub pedestal extension in the manner shown in Patent No. 2,513,844, for example. To withstand downward thrust, the shaft 32 is provided with an annular groove 31, in which is seated a split ring 33, in an annular retaining cup 29.

The motor shaft 42 extends through the housing, and projects from the other side into a centrifugal pump casing 44, of the reversible type, the shaft being fitted with an impeller (not shown) within such casing.

Laterally disposed within the casing on the plane of the motor shaft, on a stub shaft 48, is positioned a worm wheel 50, and freely journalled on the sleeve shaft 32, is a spiral toothed gear 52, the latter being provided with a bearing bushing 54 for this purpose. The gear 52 bears downwardly against a thrust washer 56, held in place by a split ring 58, mounted in an external groove in the lower end of the spin sleeve shaft 32.

The agitator shaft 30, immediately therebelow is provided with a collar 60, having affixed thereto a clutch ring 62 provided with a ring of apertures 64 therein, to receive the tooth extensions 66 of the teeth 68 of pinion 70. The collar 60 is secured to the shaft by a cross pin 72, and is provided with an upwardly extending annular flared cup 73 which encompasses the split ring sufficiently closely so as to confine the split ring to its groove. The pinion 70 is provided with an annular groove 74, adapted to receive a shifter fork 76, so as to permit the pinion teeth ends 66 to engage the apertured ring for drive, when lifted to the position shown, or disconnect the drive, by lowering the pinion 70 and teeth extensions 66 clear of the ring apertures 64.

The worm wheel 50 is provided with a crank pin 78 and connecting rod 80, for oscillatory driving of a sector gear 82, which is journalled on a stub shaft 84. The sector gear remains in constant mesh with the pinion 70, and provides agitator oscillatory motion to the agitator shaft 30 when the pinion 70 is in the raised position shown. The motor drive shaft is provided with an integral worm 86 for driving the worm wheel 50 at a proper speed of about sixty revolutions per minute, and is also provided with a spiral toothed pinion 88, in mesh with the spiral gear 52 for driving the spin shaft at a proper speed. With a motor whose speed is about 1750 r.p.m., the gear ratio may be about 2.8 to 1.

The pinion 88 is free on the motor shaft 42, and is provided with an over-running clutch 89 for drive from the motor shaft, when rotating in one direction. Such over-running clutch may comprise a collar 93 affixed to the motor shaft, cooperating with a cylindrical portion 90 having an end flange 92 of the pinion 88. The collar and hub have aligned contiguous cylindrical surfaces over which is disposed a spiral clutch spring 91, which on rotation in the one direction grips the pinion hub and collar to effect a drive while releasing on reverse rotation.

Shifting of the sector gear pinion on the agitator shaft 30 is accomplished by a vertically movable shifter frame 92, having the fork 76 at its lower end extending into the pinion fork groove 74, and having an inclined cam follower lug 94 at its upper end, such frame being vertically slidable upon rod 96 projecting downward from the upper casing member 20.

Located above the worm wheel is a disk 100, which is freely rotatable about the stub shaft 48. An annular ridge 101, discontinuous at the pin 78, axially confines the disk. Such disk 100 has a depending drive tongue 102 overhanging a grooved collar 104 on the worm wheel, the groove of which is provided with a split resilient friction ring 106. The free ends of the split ring are spaced slightly greater than the width of the tongue, and, either end is adapted to engage the drive tongue 102, depending on rotation direction. The disk is also provided with a depending arcuate flange 108, located in the region adjacent the upper end of the shifter frame, which flange is provided with a helical cam slot 110 into which the inclined cam follower lug 94 extends. Thus on rotation of the worm wheel 50 in the direction A for agitator drive, one end of the split ring 106 is brought to bear against the drive tongue 102, rotating the disk 100, and elevating the shifter fork by the cam action. When elevated, the split ring commences to slip in the groove while the worm wheel 50 continues to rotate. On reverse rotation of the worm wheel, the opposite end of the split ring 106 engages the tongue 102, causing rotation of the disk 100 in the opposite direction, thereby lowering the shifter fork by the cam action to disengage the pinion 70 from the perforate ring 62.

When the motor rotates in the direction S for driving the spiral spin gear 52, drive to the sleeve shaft 32 is effected through a novel substantially constant torque slip clutch. For this purpose, the gear 52 is provided with a drive sleeve or shell 112 extending upwardly around the spin shaft in spaced relation thereto. The spin shaft 32 is provided with a collar or sleeve 114 having a cylindrical external friction drive surface, the collar being keyed to the spin sleeve shaft 32 as at 116. Immediately above the collar 114 is a brake sleeve 118 having an external flange 120 adjacent its upper end, to which is secured a brake drum 122. The brake sleeve is provided with an internal-bearing bushing 124 rotating freely on shaft 32, and the sleeve 118 extends upwardly to the inner race of the bearing 34. The brake sleeve is provided with an external cylindrical surface 119 of a diameter approximately .045" less than the external diameter of the cylindrical surface 115 of the collar 114.

Disposed on the collar and sleeve 114 and 118 is a helical resilient friction coil one way clutch spring 126, the upper end of which has a radial extension 128 that extends into a slot 130 in the end of the shell 112. When spin drive to the tub through shaft 32 for extraction is desired, the gear 52 is driven from the motor shaft through the overrunning clutch 89, and drive to the sleeve shaft 32 is effected frictionally through contact of the lower end turns of the coil spring 126. During such drive, the coil spring rotates in a direction which tends to expand its internal diameter, rather than contract, so that a slip drive is provided. At this time the upper turns of the coil spring 126, which overlie the brake sleeve 118, are expanded out of contact therefrom, by reason of the driving torsion in the spring 126, which tends to expand its diameter, and the lesser diameter of the external cylindrical surface 119 of the sleeve 118. The relaxed internal diameter of the coil spring 126 before assembly, is smaller than the external cylindrical diameter 115 of the collar 114, and the relation is such that a frictional drive of about 2 to 2½ foot pounds torque is established, such torque being that necessary to gradually accelerate the tub to centrifugal extraction speed, while at the same time not overloading the motor. Thus the motor is permitted to operate at load speed, close to its maximum, so that the pump will be driven at substantially full speed, to remove extracted water from the outer tub during the acceleration period. When the tub reaches approximate maximum speed, and the necessary drive torque to maintain rotation drops below 2 to 2½ foot pounds, the slippage stops and to all intents and purposes, a direct drive to collar 114 is effected. The relaxed internal diameter of the spring 126 may be about .060" less than the external diameter of collar 114, when the sleeve is, for example, about 1⅝" diameter.

When the spinning period ends, the motor may be stopped, whereupon pinion 88 overruns, by reason of clutch 89. When this occurs, coil spring 126 is no longer subjected to expanding driving torque, and thereupon contracts sufficiently to contact surface 119 of sleeve 118, and once such contact is made, friction from the contact tends to contract the spring 126, immediately establishing a positive drive from collar 114 to brake sleeve 118, and the brake drum 122 is thus caused to rotate.

The brake drum is provided with an external split resilient spring band 132, having an internal brake lining face 134. Such band adjacent one end has an anchoring aperture 136, into which extends the end of a radially extending anchor stud 138, the stud being threaded through the casing wall, in a boss 140. The band is so disposed on the drum, with reference to the anchor aperture 136, as to provide self energization of the brake band upon the drum by reason of the direction of rotation of the drum.

After a period of deceleration, shortened by the braking action, the motor may be reversed, for agitator drive, at which time the shifter fork 76 will lift and clutch the pinion 70 to the perforate ring 62, while the overrunning clutch 89 serves to continue to disconnect the motor drive from the tub spin shaft 32.

The friction drive for accelerating the tub provides a constant accelerating torque, irrespective of motor speed, or tub speed. For this reason, the motor may be of the two speed variety whereby reduced agitating-spinning speed may be employed. In that event the motor may have a field structure such that speeds of 1750 or 1150 r.p.m. may be had by shifting the field connections to vary the effective poles from 4 to 6. Thus irrespective of motor speed, the same accelerating torque through the friction drive is available.

The friction drive spring 126 may have a rounded inner edge, and the entire transmission will be subjected to an adequate supply of oil in the casing. While some heat will be generated by the friction between the coils of spring 126 and the sleeve 114, the dissipation of such heat through the shaft assembly prevents the temperature from rising unduly, even should the tub be not brought to speed, by reason of unbalance or other reason.

It will be appreciated that the transmission unit described may be mounted as an inverted pendulum, at the lower end extension 140, to permit the tub, during spinning, to find its center of gravity to compensate for unbalanced laundry loads, and that, any desired means for damping gyratory movement during acceleration through the "critical" may be employed as desired. The entire transmission casing, motor, pump, and spin tub comprise a unitary mechanism.

Operation of the transmission may be effected by the usual timer which may control the necessary water supply, or be actuated when sufficient water has been supplied to the tub. Agitator actuation then takes place for a given period followed by a reversal of the motor, which causes centrifugal extraction of the wash water. During such extraction water may be sprayed into the tub for a spray rinse. Water may then be introduced into the tub, and by motor reversal, agitation commenced for an agitated rinse. Overflow may be permitted during this operation, following which, by motor reversal centrifugal extraction is effected.

By reason of the slip clutch, and its constant torque characteristics, the foregoing operations may be effected at different speeds by using a motor capable of operating at either of two different constant speeds. Irrespective of motor speed, the acceleration torque will be the same.

It will be seen that, should an unbalanced load be present such as to preclude acceleration of the tub to full extraction speed, nevertheless spinning at a lower speed will be effected. In fact, such speed as the constant torque is able to induce will result, and if such speed be less than full speed, slippage will occur without harm, or serious overload to the motor, and the motor will operate at full speed, rendering the pump effective to remove extracted water immediately.

While specific relative diameters as between the coil 126, and the collars 114 and 118 have been referred to, it will be appreciated that the diameters may be varied to provide such torque as is desired, insofar as the coil 126 and collar 114 is concerned. In regard to sleeve 118, the diameter should be such that the driving torque through the coil 126 will expand the coil out of contact, but it will also appear that should there be contact, such contact would be effective to cause coil expansion, so as to reduce the frictional contact therewith. The rotation direction is such as to result in slippage, in respect to sleeve 118, rather than seizure, so long as drive from the sleeve 112 to the collar 114 is being effected. The slippage, or friction torque at collar 114, of course will depend on the resiliency of the spring 126, the number of turns, the relation between the relaxed internal diameter of the spring 126, and the external diameter of the collar 114 and other factors. In the case of an accelerating drive for a washer, using a fractional horsepower motor, such torque may be about two foot pounds at 1750 r.p.m., without overloading the motor, and such torque remains uniform throughout the entire acceleration.

In washing machines of the type referred to, the wash load, at the time of shifting from washing to extraction, may tend to momentarily create a drag between the agitator and tub, such that the momentary delay in declutching the agitator, while tending to initiate extraction, would overload the driving motor, causing a stall. The constant torque slip clutch permits slippage at this point, so no stall results, and as soon as the agitator shaft is declutched, all parts such as the agitator and tub, as well as the wash load, are permitted to accelerate together under the constant torque friction drive thus provided.

With constant torque acceleration, centrifugal elimination of water from the tub during initial acceleration of the extractor, is controlled to prevent too rapid elimination of the water, or any tendency of the water of clothes to flood over the top of the tub. The clothes, by reason of gradual uniform acceleration torque, tend to remain lower in the tub, where any unbalance is less effective to create a serious vibration effect.

Further with constant torque acceleration, the torque may be at a low uniform level to effect gradual acceleration. With such gradual acceleration, there are several advantages which result where spinning of an unbalanced load is attempted. Chief among these may be the prevention of attainment of dangerous high speeds with a seriously unbalanced load, because of the lengthened time for water elimination at low speeds.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a transmission for washing machines, a transmission casing, a reversible motor driven shaft extending transversely therethrough, means for driving said shaft at constant speed in either direction, concentric vertical axis tub and agitator shafts extending from said casing for driving a centrifugal tub and an agitator respectively, means for driving said agitator shaft from said motor driven shaft on rotation in one direction, means for driving said tub shaft from said motor driven shaft on opposite rotation thereof, said last named means including a constant torque friction drive coaxially disposed about said tub shaft.

2. In a transmission for washing machines, a transmission casing, a reversible, substantially constant speed motor shaft extending transversely therethrough, concentric vertical axis tub and agitator shafts extending from said casing for driving a centrifugal tub and an agitator respectively, means for driving said agitator shaft from said motor shaft on rotation in one direction, means for driving said tub shaft from said motor shaft on opposite rotation thereof, said last named means including a constant torque friction drive coaxially disposed about said tub shaft.

3. In a transmission for washing machines, a transmission casing, a motor shaft extending transversely therethrough, concentric vertical axis tub and agitator shafts extending from said casing for driving a centrifugal tub and an agitator respectively, means for driving said agitator shaft from said motor shaft, means for driving said tub shaft from said motor shaft, said last named means comprising a helical resilient coil coaxial around said tub shaft driven from one end thereof by said motor shaft, and a cylindrical friction collar coaxial therewith and embraced frictionally under radial compression by the turns of the other end of said coil, said coil being driven in a direction tending to expand the diameter of said turns on frictional slippage between the turns and said collar.

4. In a transmission for washing machines, a transmission casing, a motor driven shaft extending transversely therethrough, concentric vertical axis tub and agitator shafts extending from said casing for driving a centrifugal tub and agitator respectively, means for driving said agitator shaft from said motor driven shaft, means for driving said tub shaft from said motor driven shaft, said last named means comprising a helical resilient coil coaxial around said tub shaft driven from one end thereof by said motor driven shaft, and a cylindrical friction collar disposed coaxial therewith and embraced frictionally under radial pressure by the turns of the other end of said coil, said coil being driven in a direction tending to reduce the radial pressure of said turns upon said collar on frictional slippage between the turns and said collar.

5. In a transmission for washing machines, a transmission casing, a motor driven shaft extending transversely therethrough, means for driving said shaft at constant speed in either direction, concentric vertical axis tub and agitator shafts extending from said casing for driving a centrifugal tub and an agitator respectively, means for driving said agitator shaft from said motor driven shaft on rotation in one direction, means for driving said tub shaft from said motor driven shaft on opposite rotation, said last named means comprising a helical resilient coil coaxial around said tub shaft driven from one end thereof by said motor driven shaft, and a cylindrical friction collar disposed coaxial therewith and embraced frictionally under radial pressure by the turns of the other end of said coil, said coil being driven in a direction tending to reduce the radial pressure of said turns upon said collar on frictional slippage between the turns and said collar.

6. In a transmission for washing machines, a transmission casing, a motor driven shaft extending thereinto, a vertical axis tub shaft extending from said casing for driving a centrifugal tub, means for driving said tub shaft from said motor driven shaft, said last named means comprising a helical resilient coil coaxial around said tub shaft driven from one end thereof by said motor driven shaft, and a cylindrical friction collar coaxial with the coil and embraced frictionally under radial pressure by the turns of the other end of said coil, said coil being driven in a direction tending to reduce the radial pressure of said turns on said collar on frictional slippage between the turns and said collar, and said collar being drivably connected to said tub shaft.

7. In a centrifugal extractor type washing machine, a centrifugal extractor, a drive shaft therefor, a slip clutch for accelerating said shaft, said slip clutch comprising a collar affixed to said shaft, a helical resilient coil spring coaxial therewith and having free end turns thereof frictionally engaging said collar under radial pressure, and means to drive said spring from an end thereof in a direction such that resistance to rotation of the free end turns tends to lighten the radial frictional engagement pressure of said turns with said collar.

8. In a centrifugal extractor type washing machine, a centrifugal extractor, a drive shaft therefor, a slip clutch for accelerating said shaft, said slip clutch comprising a collar affixed to said shaft, a helical resilient coil spring coaxial therewith and having free end turns thereof frictionally engaging said collar under radial pressure, and means to drive said spring at a relatively constant speed, in a direction such that resistance to rotation of the free end turns tends to lighten the radial frictional engagement pressure of said turns with said collar.

9. A slip clutch, and brake for a centrifugal extractor comprising an extractor drive shaft, a drive collar affixed thereto, a helical drive spring coaxial therewith having a plurality of helical end turns in radial pressure engagement with said collar for frictional drive thereof, means disposed axially from said collar for rotatably driving said spring from the other end thereof in a direction to lighten the radial pressure engagement of said turns upon said collar upon relative slippage therebetween, a friction brake freely rotatable on said shaft, said brake having a driving sleeve disposed in coaxial relation within the driving end turns of said spring, said end turns being adapted when torsionally loaded for driving said shaft collar to radially clear said brake driving sleeve, and adapted when relieved of said torsional driving load to grip said brake driving sleeve.

10. In a transmission for washing machines, a transmission casing, a reversible motor shaft extending transversely therethrough, concentric vertical axis tub and agitator shafts extending from said casing for driving a centrifugal tub and an agitator respectively, means for driving said agitator shaft from said motor shaft on rotation in one direction, means for driving said tub shaft from said motor shaft on rotation in the other direction, said last named means comprising a helical resilient coil driven from one end thereof, and a cylindrical friction collar coaxial therewith and embraced frictionally under radial pressure by the turns of the other end of said coil, said coil being driven in a direction tending to reduce the pressure of said turns upon the collar on frictional slippage between the turns and said collar, and a brake for said tub shaft having a driving sleeve freely rotatable and disposed on said tub shaft in axial position in respect to the other turns of said coil, the diameter of said brake driving sleeve being such as to radially clear said coils, when torsionally stressed from driving said tub shaft.

11. In a transmission for vertical axis agitator centrifugal extractor washing machine, a transmission casing, an agitator shaft extending upwardly from said casing, a tub hollow spin shaft coaxially disposed about said agitator shaft and extending upwardly from said casing, a pinion slidably and freely rotatable upon said agitator shaft on an exposed portion thereof below the lower end of said spin shaft, and means for coupling said pinion to the agitator shaft upon axial movement thereof to a coupling position thereon; a reversible power shaft extending into said transmission casing, means for oscillatably driving said pinion irrespective of rotation directon of said power shaft, means for moving said pinion from the coupling position upon rotation of said power shaft in one direction and moving said pinion into the coupling position on reverse rotation, a drive gear freely journalled on said hollow shaft, means for driving said gear in a single direction only from said power shaft on rotation thereof in said one direction, a coaxial hollow shell affixed to said drive gear, a helical coil spring disposed within said shell, and having an end drivably connected to one end of said shell, and the free end convolutions extending in the single direction of rotation of said drive gear, a pair of friction sleeves disposed on said hollow shaft within said spring, one of said sleeves being affixed to said hollow shaft and disposed radially within the free end turns of said coil, and the other of said sleeves being rotatably free on said hollow shaft, and being disposed radially within the connected end turns of said coil, a brake drum drivably connected to said freely rotatable sleeve, having a friction brake shoe anchored to said casing, the turns of said spring in engagement with said affixed sleeve being at all times under radial resilient compressional engagement therewith for frictional and direct drive thereof through the remaining turns of the spring from said shell, and the remaining turns being in engagement with said free sleeve only when not torsionally stressed from said drive therethrough from said shell, whereby continued rotation of said hollow shaft upon cessation of drive from said shell couples said affixed and free sleeves together to rotate said brake drum.

12. In a transmission for vertical axis agitator centrifugal extractor washing machine, a transmission casing, an agitator shaft extending upwardly from said casing, a tub hollow spin shaft coaxially disposed about said agitator shaft and extending upwardly from said casing, a pinion slidably and freely rotatable upon said agitator shaft, and means for coupling said pinion to the agitator shaft upon axial movement to a coupling position thereon; a reversible power shaft extending into said transmission casing, means for oscillatably driving said pinion irrespective of rotation direction of said power shaft comprising a wheel and crank driven from said power shaft, means slidable parallel with said agitator shaft for moving said pinion between said couplnig position and an uncoupled position, and means coaxial with said wheel and angularly rotatable by friction contact therewith and cooperating with said slidable means for causing said slidable means to shift said pinion into and out of coupled position upon reverse rotation of said wheel.

13. In a transmission for vertical axis agitator centrifugal extractor washing machine, a transmission casing, an agitator shaft extending upwardly from said casing, a tub hollow spin shaft coaxially disposed about said agitator shaft and extending upwardly from said casing, a pinion slidably and freely rotatable upon said agitator shaft, and means for coupling said pinion to the agitator shaft upon axial movement to a coupling position thereon; a reversible power shaft extending into said transmission casing, means for oscillatably driving said pinion irrespective of rotation direction of said power shaft comprising a wheel and crank driven from said power shaft, means slidable parallel with said agitator shaft for moving said pinion between said coupling position and an uncoupled position, means coaxial with said wheel and angularly rotatable by friction contact therewith and cooperating with said slidable means for causing said slidable means to shift said pinion into and out of coupled position upon reverse rotation of said wheel, and means for driving said spin shaft from said power shaft on rotation thereof in the direction for uncoupling said pinion, said last named means including a substantially constant torque friction drive coaxially disposed with respect to said spin shaft.

14. A slip clutch and brake for a centrifugal extractor comprising an extractor drive shaft, said shaft having a friction drive surface affixed thereto, and an adjacent coaxial sleeve freely rotatable relative thereto disposed adjacent said drive surface, means to brake the rotation of said adjacent sleeve, a helical drive spring coaxially disposed over said surface and sleeve, and normally frictionally contacting both said surface and sleeve, with radial pressure on said surface being greater than on said sleeve, and means to drive said coil spring from the end thereof overlying said sleeve and in a direction to lessen the radial pressure of said turns of said coil upon said sleeve and surface.

References Cited in the file of this patent

UNITED STATES PATENTS

| | | |
|---|---|---|
| 1,126,780 | Jones | Feb. 2, 1915 |
| 1,803,981 | Snyder | May 5, 1931 |
| 1,952,415 | Brownlee | Mar. 27, 1934 |
| 2,161,604 | Watts | June 6, 1939 |
| 2,360,187 | Almen | Oct. 10, 1944 |
| 2,366,236 | Clark | Jan. 2, 1945 |
| 2,373,462 | Crow | Apr. 10, 1945 |
| 2,441,053 | Wooster | May 4, 1948 |
| 2,497,686 | Young et al. | Feb. 14, 1950 |
| 2,571,438 | Gerhardt et al. | Oct. 16, 1951 |
| 2,609,697 | Ruscoe | Sept. 9, 1952 |
| 2,629,469 | Dayton | Feb. 24, 1953 |
| 2,684,137 | Landwier | July 20, 1954 |
| 2,720,953 | Dayton | Oct. 18, 1955 |
| 2,737,274 | Mouravieff | Mar. 6, 1956 |
| 2,751,773 | Woodson | June 26, 1956 |
| 2,837,927 | Stelljis et al. | June 10, 1958 |
| 2,887,887 | Jennings | May 26, 1959 |

FOREIGN PATENTS

| | | |
|---|---|---|
| 204,257 | Australia | Nov. 15, 1956 |